(12) United States Patent
Degler et al.

(10) Patent No.: US 7,513,346 B2
(45) Date of Patent: Apr. 7, 2009

(54) POWER TRANSMISSION DEVICE

(75) Inventors: Mario Degler, Baden-Baden (DE);
Bruno Mueller, Sasbach (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 11/904,220

(22) Filed: Sep. 26, 2007

(65) Prior Publication Data

US 2008/0078638 A1     Apr. 3, 2008

(30) Foreign Application Priority Data

Sep. 28, 2006   (DE) ...................... 10 2006 045 855

(51) Int. Cl.
*F16H 45/02*     (2006.01)
(52) U.S. Cl. .................... 192/3.3; 192/113.36
(58) Field of Classification Search ......... 188/170–171; 192/3.29, 3.3, 70.17, 85 AA, 213.1, 113.36
See application file for complete search history.

(56) References Cited

U.S. PATENT DOCUMENTS

| | | | |
|---|---|---|---|
| 6,332,521 B1 * | 12/2001 | Shoji | 192/55.61 |
| 6,695,110 B2 * | 2/2004 | Maienschein et al. | 192/3.3 |
| 7,222,706 B2 * | 5/2007 | Tomiyama | 192/3.29 |
| 2004/0144607 A1 * | 7/2004 | Back et al. | 192/3.3 |
| 2005/0199461 A1 * | 9/2005 | Zuehl | 192/3.29 |
| 2007/0181396 A1 * | 8/2007 | Maienschein et al. | 192/3.29 |
| 2008/0083594 A1 * | 4/2008 | Degler et al. | 192/3.29 |

FOREIGN PATENT DOCUMENTS

| | | |
|---|---|---|
| DE | 199 09 349 | 9/1999 |
| DE | 199 20 542 | 11/1999 |
| DE | 103 50 935 | 5/2004 |

* cited by examiner

*Primary Examiner*—Christopher P Schwartz
(74) *Attorney, Agent, or Firm*—Simpson & Simpson, PLLC

(57) ABSTRACT

A power transmission device, in particular for use in vehicles, having one input and at least one output, comprising a hydrodynamic component and a lockup clutch. The lockup clutch includes at least one friction surface arrangement which is coupled at least indirectly in a rotationally fixed manner with the input of the power transmission device, or is coupled in a rotationally fixed manner with the pump wheel, and can be brought into an operative connection with a second frictional surface arrangement which is connected to the output in a rotationally fixed manner. An actuating mechanism is assigned to the lockup clutch. The actuating mechanism forms one structural unit with a friction surface carrying element of the first friction surface arrangement, and is coupled in an axially movable and rotationally fixed manner with the input of the power transmission device, or with the connection between the input and the pump wheel.

18 Claims, 6 Drawing Sheets

POWER TRANSMISSION DEVICE

CROSS REFERENCE TO RELATED APPLICATIONS

This patent claims priority of German Patent Application No. 10 2006 045 855.9, filed Sep. 28, 2006, which application is incorporated herein by reference.

FIELD OF THE INVENTION

The invention relates to a power transmission device.

BACKGROUND OF THE INVENTION

Power transmission units for transmission components are known in a plurality of versions from the existing art. These normally include an input and an output, between which a hydrodynamic component for hydrodynamic power transmission is situated, comprising at least a pump wheel and a turbine wheel, which together form a working chamber which is filled with or may be filled with process fluid; in the case of versions such as torque converters there are also a guide wheel and a device in the form of a lockup clutch to bypass the hydrodynamic power branch. The lockup clutch also comprises at least a first friction surface arrangement having at least one element carrying a friction surface, and a second friction surface arrangement having at least one element carrying a friction surface, which may be brought into operative connection with each other by means of an actuating mechanism. The function of the lockup clutch here is to create a coupling between the input or the connection between the input and the pump wheel and the turbine wheel. In the simplest case, the actuating mechanism comprises an axially movable piston which presses the individual friction surface arrangements against each other. The power transmission device is designed as a two-channel or three-channel system, depending on the operating principle of the lockup clutch. At the same time, the flow through the hydrodynamic component may be centrifugal or centripetal, it also being possible for the directions of flow to change depending on the mode of operation. In the case of hydrodynamic torque converters, the process fluid remains in the converter even during bypassing. A coolant circuit forms an external converter circuit through the connections on the converter and the intermediate space between actuating mechanism and housing. The guidance takes place via channels integrated into the clutch arrangement, in particular between the friction elements that can be brought into operative connection with each other, radially outwardly to the outer circumference, viewed from the axis of rotation, and after that radially inwardly on the hydrodynamic component, or vice versa. In the latter cases, the lockup clutch is operated by the pressure in the hydrodynamic component; that is, the pressure present outside of the hydrodynamic rotational speed/torque converter or the hydrodynamic clutch is used to operate the piston element. Such designs are described for example in published patent DE 199 20 542 A1. The latter reveals a power transmission device having a fluid clutch or a hydrodynamic rotational speed/torque converter and an integrated damping system. In this design the actuating mechanism is either supported so that it is movable in the axial direction on the connection between pump wheel and input of the power transmission device and guided so that it is sealed against the connection between input of the power transmission unit and pump wheel. Between the inner wall of the connecting housing, between the input of the power transmission unit and the pump wheel, a pressure chamber functioning as an actuating chamber is formed, which serves to apply pressure to the piston of the actuating mechanism independent of the pressure in the hydrodynamic component. To that end, along with the connections to the converter or hydrodynamic component, normally in the pump neck or support shaft for the guide wheel and a connection to create and maintain an external circuit, in particular for cooling purposes, an additional connection is provided, through which the pressure chamber between actuating mechanism and housing may be charged with pressure medium. The system is therefore referred to as a three-channel system. The linking of the actuating element and the design of the lockup clutch turn out to be very complex here however, in particular due to the large number of existing components. The lockup clutch is designed as a lamellar clutch, and because of the separate pressure chamber the clutch elements which are connected at least indirectly to the pump wheel are designed as outer lamellae, while the second clutch elements connected to the output of the power transmission device, in particular in this case to the device for damping vibrations, are designed as inner lamellae. The actuating mechanism works here in the axial direction against the lamellae, for which reason an additional stop is also provided here in the axial direction to brace the actuating mechanism in the axial direction during actuation, which is connected in a rotationally fixed connection to the connection between the input of the power transmission device and the pump wheel. The lockup clutch itself can only be designed as a multiple-plate clutch, in particular a lamellar clutch, due to the arrangement of the actuating mechanism and the linkage to the other elements, and therefore likewise becomes very large in the axial direction. Furthermore, when the actuating pressure is fed in through the transmission input shaft it is necessary to seal this pressure chamber against the other pressure chambers of the converter.

One version of a power transmission device with a hydrodynamic torque converter in two-channel construction is anticipated from DE 199 09 349 A1. In this version, a lock-up clutch is assigned to the hydrodynamic rotational speed/torque converter. The piston element here is guided so that it is axially movable at the output of the power transmission unit. In addition, the piston element has a friction surface. The design of the total system is therefore characterized by a small number of components. However, this system is not suitable for applying pressure separately to the piston, in particular the actuating mechanism, since here the pressurizable piston surface bounds the pressure chamber to the hydrodynamic rotational speed/torque converter, and thus an actuation always takes place depending on the magnitude of the pressure prevailing in the hydrodynamic component.

Another version of a three-channel system for a power transmission device is anticipated from published patent DE 193 50 935 A1. Here the piston is likewise supported and guided at the connection between the input of the power transmission device and the pump wheel. The actuating mechanism is thus completely supported on the input side of the power transmission device, and is guided in the axial direction on the latter. In addition, the hydrodynamic component has a so-called pump wheel shell which is coupled to the latter in a rotationally fixed manner, which is coupled to the input of the power transmission device, forming an axial intermediate space. Integrated into this intermediate space in the axial direction are the lockup clutch and a device for damping vibrations. At the same time, the output of the LOCKUP clutch is coupled with the output of the power transmission device through the device for damping vibrations. The axial arrangement of the lockup clutch and the device for damping vibrations produces a plurality of individual pressure chambers and channels. Here too, the complete system is characterized by a significant number of components, which results not only in an enlargement of the necessary construction space in the axial direction but also in substantial additional costs.

SUMMARY OF THE INVENTION

The object of the invention was therefore to refine the development of a version of a clutch arrangement in the form of a lockup clutch in a power transmission device of the type named at the beginning, in particular with the possibility of separate charging of the activating mechanism independent of the pressure in the hydrodynamic component, in such a way that on the one hand it can be pressurized with a freely selectable pressure and on the other hand the complete system is characterized by simple construction and a small number of parts.

A power transmission device includes at least one input and one output, there being situated between these a hydrodynamic component comprising at least one primary wheel functioning as a pump wheel and one secondary wheel functioning as a turbine wheel, which together form a working chamber which is or may be filled with process fluid, as well as a lockup clutch for at least partially bypassing the hydrodynamic power branch in the transmission of power. In addition, the lockup clutch includes at least one friction surface arrangement which is coupled at least indirectly in a rotationally fixed manner with the input of the power transmission device or is coupled in a rotationally fixed manner with the pump wheel, and can be brought into an operative connection with a second friction surface arrangement which is connected to the output in a rotationally fixed manner. To that end, an actuating mechanism is assigned to the lockup clutch. According to the invention, the actuating mechanism forms one structural unit with a friction surface carrying element of the first friction surface arrangement, and is coupled in an axially movable and rotationally fixed manner with the input of the power transmission device, or at least with the connection between the input and the pump wheel. Furthermore, a sealing apparatus comprising a first sealing device between the actuating mechanism and the connection between pump wheel and power transmission unit and a second sealing device between the actuating mechanism and the output of the power transmission device is provided, which seals the pressure chamber, which may be pressurized with an actuating pressure, from the hydraulic component.

The solution according to the invention thus makes it possible on the one hand to design a very compact lockup clutch, since the actuating mechanism forms one structural unit with it. In terms of detail this means that the piston element is simultaneously designed as a friction surface carrying element, so that it is possible to dispense with separate friction surface carrying elements which must be connected in a rotationally fixed manner with the pump wheel or with the connection between pump wheel and power transmission device input. Furthermore, the pressure chamber is sealed on a single element, the piston element, and the piston is guided in a simple manner with respect to the output of the power transmission device, free of a rotationally fixed connection with the output, the second sealing device being provided here only between the radially inner part of the piston and the output of the power transmission device. The two sealing devices comprise movable contact seals.

The pressure chambers that must be sealed against each other include in the first case the pressure chamber in the hydrodynamic rotational speed/torque converter, i.e. the pressure chamber situated next to the hydrodynamic rotational speed/torque converter in the axial direction and the pressure chamber for operating the lockup clutch. As a result, it is possible for the actuating mechanism to be controlled independent of the pressure in the hydrodynamic component.

In the simplest case, the input of the power transmission device is formed of an element that is coupled with the pump wheel in a rotationally fixed manner, for example a pump wheel shell, and a cover. Multiple-piece designs are also conceivable. This includes the turbine wheel in the axial direction, while forming an intermediate space in the circumferential direction completely. The lockup clutch is situated in the intermediate space in the axial direction. In the simplest case this is designed as a clutch device operable with slippage, i.e., preferably in the form of a disk clutch or lamellar clutch. Preferably the first clutch element here is formed by an outer lamella, which is connected in a rotationally fixed manner with the wall or the housing of the hydrodynamic component through an outer lamella holder. The second element that may be brought into operative connection with the first clutch element is connected in a rotationally fixed manner with the output of the power transmission device, which is preferably formed of a transmission input shaft of a transmission situated downline from the power transmission unit. The clutch elements, as friction surface elements, are part of the friction surface arrangements.

The design of the piston element as a friction surface carrying element of the first friction surface arrangement of the lockup clutch results in a concentration of functions. The piston is preferably guided in the area of its outer circumference in the radial direction at the connection between the input of the power transmission device and the pump wheel or the pump wheel itself. The piston thus forms an outer lamella. The rotationally fixed coupling with axial movability can be realized in various ways. In the simplest case, positive or frictional connections are chosen. To that end, complementarily designed driving elements are formed on a partial area of the piston that forms an outer circumference, that is, an area that is directed radially toward the outside and an area that is directed radially toward the inside, or a partial area forming an inner circumference on the wall or the connection between input of the power transmission device and the pump wheel, which driving elements fix the position between the housing, in particular the connection between primary wheel and power transmission device input and first clutch element of the lockup clutch in the circumferential direction and the radial direction with respect to each other, and which are oriented in such a way that they enable a movability with respect to each other, i.e., a relative motion in an axial direction and in a circumferential direction. An additional fixing at the output of the power transmission device is thus no longer necessary. The fixing is shifted here in the radial direction into the area of the outer circumference.

The piston element is preferably designed as a formed part and has at least four areas, a first and second sealing area, a stop area to limit the axial movability in the direction contrary to the lockup clutch, and a friction surface bearing area, where the sealing areas in turn have surface areas that are designed parallel to the connecting elements housing and output, the sealing devices being situated between these. The first sealing device is situated between a surface area on the actuating mechanism that is oriented in the radial direction and a surface area on the connection between the input of the power transmission device and the hydrodynamic component, pointing in the radial direction to the axis of rotation, and the second sealing device in the radial direction between the output of the power transmission device and the actuating mechanism.

The piston element, which is complex due to the segmentation into the individual functional areas and their specific design, can in addition be produced in a simple manner as a disk-shaped formed part, of cast iron, a light metal, a synthetic or a fiber composite material.

According to an especially preferred design, the power transmission device includes a device for damping vibrations, in particular in the form of a torsion vibration damper. This can be designed in various ways, the design being dependent essentially on the realization of the damping function. However, the device for damping vibrations comprises essentially two masses which are rotatable to a limited extent opposite each other in the circumstantial direction, which are connected to each other through means of spring and/or damping coupling. The coupling can be done purely mechanically, hydraulically, or by a combination of these. The device for damping vibration is arranged in the axial direction between the lockup clutch and the hydrodynamic component, preferably between the actuating mechanism and the hydrodynamic component. The input of the device for damping vibrations forms the second clutch element or the second friction surface arrangement of the lockup clutch, which is coupled with the output of the power transmission device through the device for damping vibrations. The device for damping vibrations functions as an elastic connection. The coupling can be realized directly with the output of the power transmission device or through an additional intermediate element in the form of a component that forms a hub. At the same time, it is also conceivable for the turbine wheel and the output of the device for damping vibrations to be connectable separately or jointly through an additional element to the output of the power transmission device in a rotationally fixed manner, or else for the turbine wheel to be connectable to the device for damping vibrations, in particular through the coupling with the output of the device for damping vibrations, and thus to be connected through an interposed damper to the output of the power transmission device.

In order to fix the actuating mechanism, in particular the piston, in the axial direction with regard to its position and to hold it in place by means of a predefined pre-tensioning, means of pre-tensioning are assigned to it. The means comprise at least one spring device, comprising at least one spring element. Depending on the arrangement and support, the spring element can be in the form of a tension spring or a compression spring. It may be supported on one side or preferably on both sides. In the simplest case, simple spring steels are provided, which are situated between the inner wall and the surface of the piston facing the inner wall of the housing and/or a surface of the piston directed toward the hydrodynamic component and the output of the power transmitting device or an element that is coupled with the latter in a rotationally fixed manner. The individual spring elements can be designed here as ring-shaped spring elements, for example in the form of diaphragm springs. Preferably, a plurality of individual spring elements are provided, whose positions are fixed with respect to the housing and the respective face of the piston. The fixing can be accomplished in the simplest case by merely inserting them in the axial direction, the positional fixing in the radial direction being determined by the shape alone. It is also conceivable to choose connections that are completely rotationally fixed and firmly fixed in the axial direction. The concrete selection depends on the case of the application.

BRIEF DESCRIPTION OF THE DRAWINGS

The solution according to the invention will be explained below on the basis of figures. They depict the following details.

DETAILED DESCRIPTION OF THE INVENTION

Figure 1A:
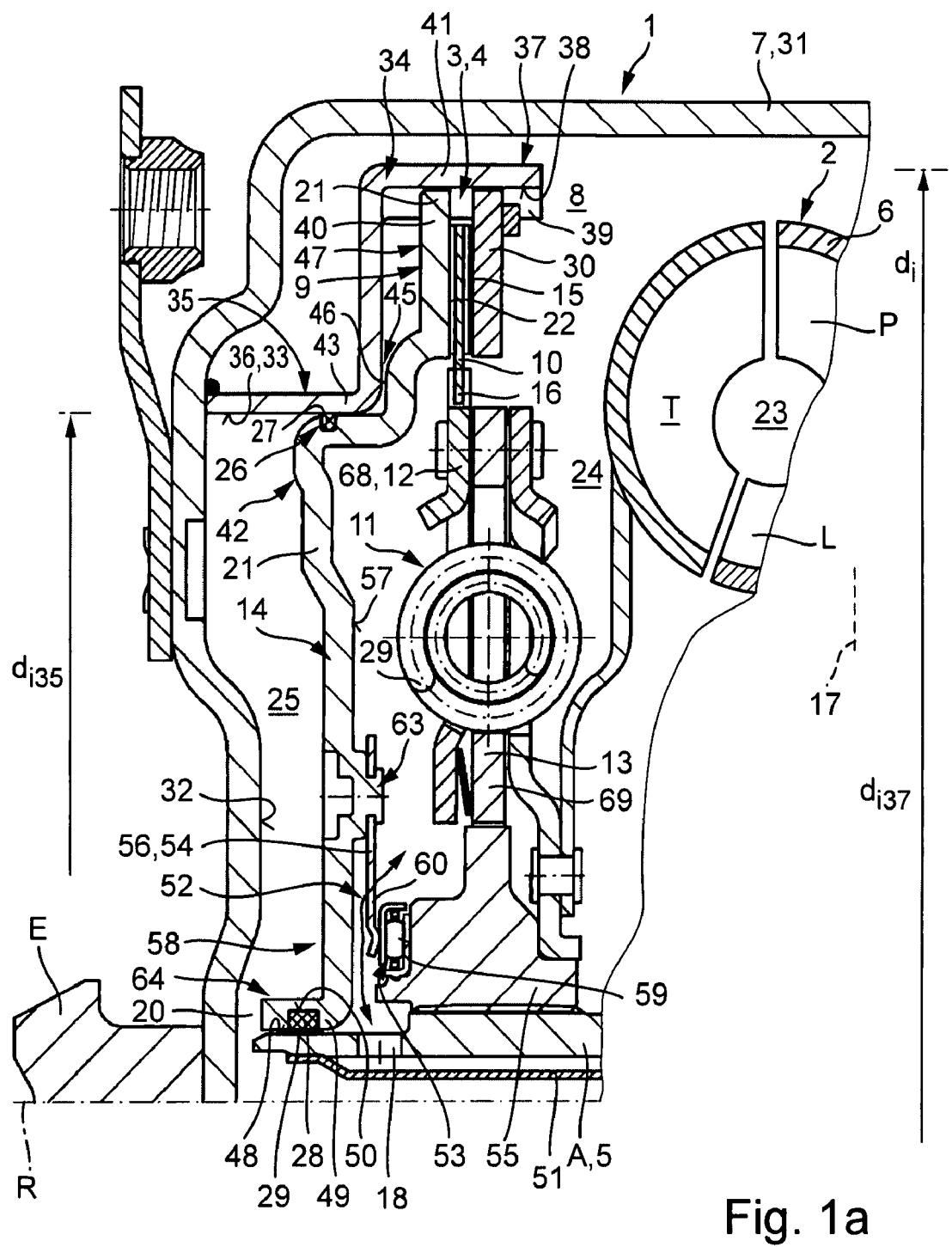
FIGS. 1a and 1b explain the basic construction of a power transmission device designed according to the invention in a greatly simplified schematic depiction.
Figure 1B:
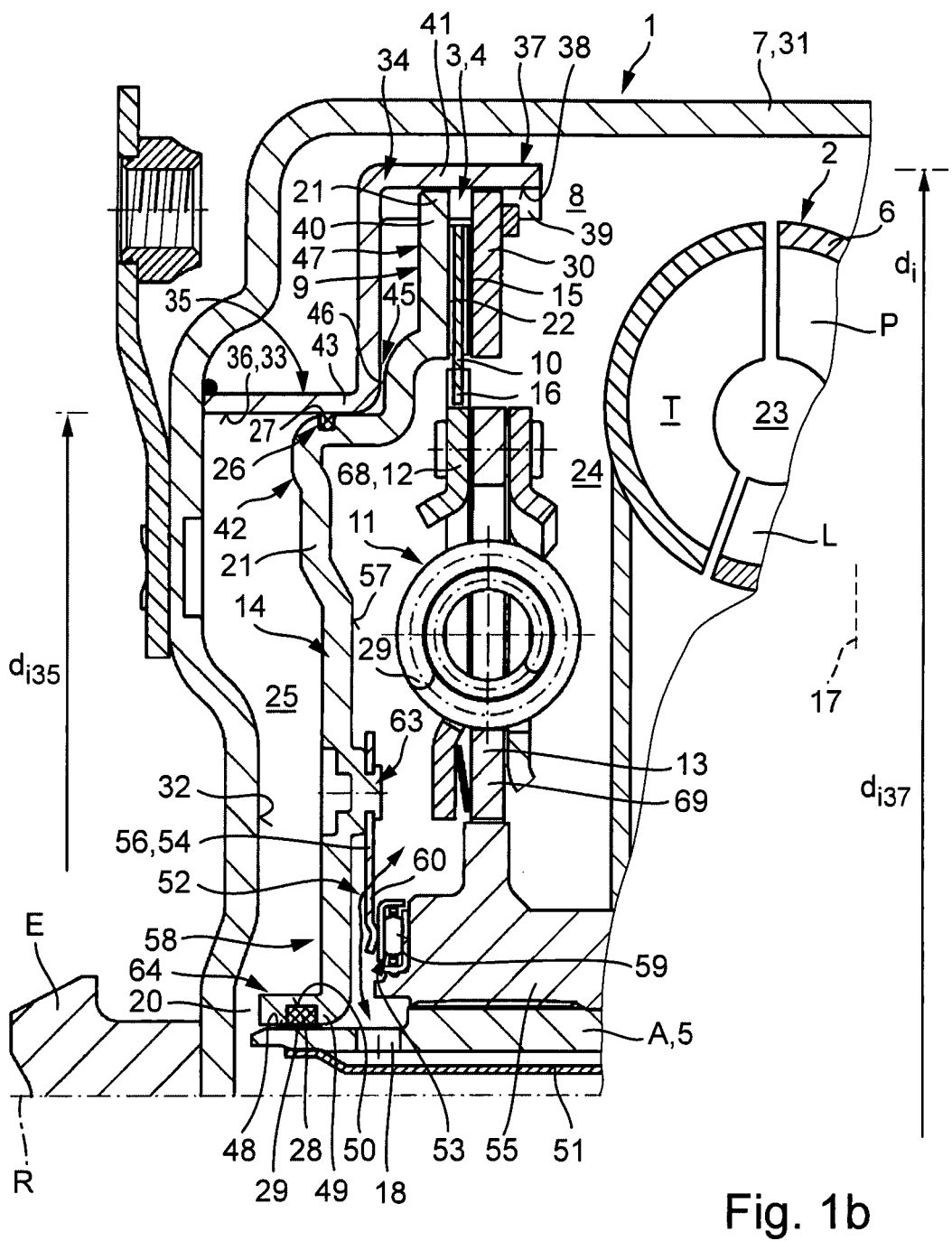

FIGS. 1a and 1b explain a first embodiment of a power transmission unit 1 designed according to the invention in a highly schematic depiction on the basis of a detail from an axial sectional view. This includes at least one input E and one output A, a hydrodynamic component 2 and a device 3 for bypassing the hydrodynamic power branch when transmitting power, which is designed in the form of a lockup clutch 4. Input E can be connected at least indirectly with a drive unit which is not depicted here. Output A can be coupled with a power transmission unit that may be situated downline from the power transmission unit 1, in particular in the form of a gearbox, and can be formed of a transmission input shaft. In the depicted case the hydrodynamic component 2 is designed as a hydrodynamic rotational speed/torque converter 6. The latter comprises a primary wheel function as a pump wheel P, a secondary wheel function as a turbine wheel T, and at least one guide wheel L.

The concrete design implementation of the hydrodynamic rotational speed/torque converter 6 corresponds to the needs of the implementation case. As a rule, it is designed in the form of a TRILOK torque converter. The hydrodynamic rotational speed/torque converter functions here quasi as a hydrodynamic transmission; that is, a change of the speed between input E and output A at the hydrodynamic rotational speed/torque converter 6 at the same time causes a change of torque. The hydrodynamic component 2 can also be designed as a hydrodynamic clutch, although that is not shown here. In this case the hydrodynamic component 2 is free of a guide wheel. In that case the hydrodynamic clutch serves only to change the speed of rotation, not to change the torque. Pump wheel P of hydrodynamic component 2 is connected here to input E of power transmission unit 1 in a rotationally fixed manner. The connection is preferably disconnectable.

Also conceivable, although not shown here, would be to provide a so-called pump clutch, which optionally enables coupling or uncoupling of pump wheel P from input E. In the simplest case, the coupling is accomplished via a housing 7 in the form of the converter housing, which comprises the pump shell and a cover. This is designed in such a way that when viewed in the axial direction it includes the lockup clutch 4, while forming an intermediate space 8. The housing 7 can be designed in one piece or multiple pieces. In the simplest case, this is formed by the pump wheel shell; that is, an element which is coupled with the pump wheel P in a rotationally fixed manner and is connected to the input E of power transmission unit 1 or forms this unit.

The lockup clutch can also be of various designs. It is usually a mechanical clutch that is non-synchronously shiftable, preferable a clutch that is operable with slippage. In the simplest case it is designed in disk construction, preferably in lamellar design. The lockup clutch 4 includes at least one first friction surface arrangement 9 and one second friction surface arrangement 10, which may be brought at least indirectly into operative connection with each other. Each friction surface arrangement 9, 10 includes at least one friction surface carrying element 15, 16. The operative connection may be made with slippage or free of slippage. The first friction surface arrangement 9 is coupled in a rotationally fixed manner with the input E or with the connection between pump wheel P and input E or with pump wheel P. The second friction surface arrangement 10 is connected at least indirectly in a rotationally fixed manner to the output A of power transmission unit 1, in particular with transmission input shaft 5. In the depicted case the coupling is made at least indirectly with the transmission input shaft 5, i.e., through a device 11 for damping vibrations in the form of a torsion vibration damper. The latter can be implemented as a mechanical damper or a hydraulic damper or as a combination of both. Here the second friction surface arrangement 10 is coupled with an input 12 of the device 11 for damping vibrations, while the output of the device 11 for damping vibrations, which is identified here as 13, is at least indirectly connected in a rotationally fixed manner to output A, in particular to transmission output shaft 5. Device 11 for damping vibrations includes at least two masses here, a first mass, the so-called primary mass 68, and a second mass 69, which is also known as the secondary mass, and which form respectively the input 12 and the output 13 of device 11. Primary mass 68 and secondary mass 69 may be twisted relative to each other to a limited degree in the circumferential direction, and are connected with each other via means 29 to the spring and/or damping coupling. Device 11 for damping vibrations functions as an elastic connection between input E of the power transmission device 1 and transmission input shaft 5. There are no restrictions with regard to the concrete design of the device 11 for damping vibrations. What is crucial is that this system is capable of integration into the total system with the smallest possible construction size, making optimal use of the available construction space. The coupling of the second friction surface arrangement 10 with the housing input shaft 5 through the device 11 can be accomplished through a hub element 55 or through direct linking to the turbine wheel T, which in this case is then connected with the transmission input shaft 5 either directly or through a hub. Otherwise it is also conceivable to not couple turbine wheel T directly to transmission input shaft 5, but rather through the linking of turbine wheel T to the input 12 of device 11 for damping vibrations.

Friction surface arrangements 9 and 10, which may be brought into operative connection with each other, each include at least one friction surface carrying element 15, 16, preferably a plurality of friction surface carrying elements. To operate lockup clutch 4 an actuating mechanism 14 is provided, including a piston element 21 that is assigned to lockup clutch 4 in the axial direction. According to the invention, actuating mechanism 14, in particular piston element 21 is connected in a rotationally fixed manner to the connection between input E of power transmission device 1 and pump wheel P, and is supported so that it is movable in the axial direction relative to that connection. The piston is guided in the axial direction so that it is sealed with respect to transmission input shaft 5. Piston element 21 forms one structural unit here with a friction surface carrying element 15 of first friction surface arrangement 9, or forms the latter directly.

Power transmission unit 1 is designed here as a three channel unit. This means that it has a first channel 17 which is coupled with the hydrodynamic rotational speed/torque converter 5, in particular the working chamber, a second channel 18 which is assigned to the intermediate space 19 between the lockup clutch 4 and the hydrodynamic rotational speed/torque converter 6, and an additional third channel 20 which serves the actuating mechanism 14, in particular pressurizing the piston element 21. Actuating mechanism 14, which includes at least one piston element 21, is designed according to the invention in such a way that a friction surface carrying element 15 of the first friction surface arrangement 9 forms one structural unit with the piston element 21, or is integrated into it. Piston 21 is coupled in a rotationally fixed manner with pump wheel P or the connection between input E of power transmission unit 1 and pump wheel P, and is movable in the axial direction with respect to the latter. The axial direction refers here to the axial movability between input E and output A of the power transmission unit. Piston 21 is then designed as a friction surface carrying element 15 and bears a friction surface 22, which in the depicted case may be brought directly into operative connection with the second friction surface arrangement 10, in particular through axial movability relative to the latter. Second friction surface unit 10 is then coupled with transmission input shaft 5 either free of axial movability relative to the latter or with little axial movability.

The individual elements in their axial arrangement to each other also form pressure chambers. A first pressure chamber 23 is formed here directly from the working chamber of the hydrodynamic component 2, a second pressure chamber 24 regarded in the axial direction between the hydrodynamic component 2 and the actuating mechanism 14, in particular the piston side of the piston element 21 lying in the direction of actuation, and a third pressure chamber 25, which is formed between piston element 21 and the wall of housing 7, in particular the connection between primary wheel P and input E. A first connection or channel 17 is coupled with the working chamber of the hydrodynamic rotational speed/torque converter 6, a second channel 18 with the second pressure chamber 24, and the third channel 20 with the third pressure chamber 25 for the actuating pressure. The first pressure chamber 23 is also connected with the second pressure chamber 24, in particular via the gap between pump wheel P and turbine wheel T in the radial direction.

According to the invention, piston element 21 is guided here so that it is sealed with respect to the first and second pressure chambers 23, 24 and the transmission input shaft 5. A sealing apparatus 26 is provided to that end. The latter includes a first sealing device 27, which is provided between piston element 21 and pressure chamber 24, and a second sealing device 28, which is provided between piston element 21, i.e., the actuating mechanism 14, and transmission input shaft 5. There is no rotationally fixed coupling in this case between actuating mechanism 14 and transmission input shaft 5. That is, they can rotate at speeds relative to each other. The second sealing device 28 in this case is a movable and contact-type seal. It may be designed in a variety of ways. In the simplest case it includes at least one sealing ring, here for example a sealing ring 29.

The coupling of the individual pressure chambers 23, 24, 25 with the corresponding channels 17 through 19 can be designed in various ways. It may involve connecting bore holes, or channels carried in shafts, axles or rotary penetrations. Here we shall mention only the functional coupling with each other. The manner of functioning is designed as follows: The hydrodynamic rotational speed/torque converter 6 is normally filled once. In the case of hydrodynamic power transmission the pump wheel P is driven, and turbine wheel T in the working chamber while a flow circuit is formed. For the purpose of cooling the process fluid, part of the process fluid is conducted outside the circuit in the working chamber. The flow through the hydrodynamic component 2 may be centrifugal or centripetal, depending on the direction. In the case of centrifugal flow, the fluid is fed via the first channel 17. Because of the centrifugal forces, part of the process fluid flows out at the outer circumference of the rotational speed/torque converter 6 in the radial direction through corresponding outlet openings or the gap between pump wheel P and turbine wheel T into pressure chamber 24, flows through the lockup clutch 4 into second pressure chamber 24, and escapes through channel 18 to the outside. In this case a cooling circuit can be created over this path for the purpose of cooling the process fluid during operation of the converter. The actuating mechanism 14 is not pressurized, or the pressure in pressure chamber 25 is lower than the pressure in pressure chamber 24. On the other hand, it is also conceivable to remove process fluid from the working chamber through the first channel 17 and to feed the process fluid back into the working chamber through the second channel 18. In this case the supplying of process fluid takes place at the hydrodynamic rotational speed/torque converter 6 from outside to inside, viewed in the radial direction; it flows through the lockup clutch 4, and the latter is held in open position because of the stream of process fluid being carried. The difference in pressure between pressure chambers 24 and 25 determines the position of piston element 21 here. In both cases the transmission of power can take place either purely hydrodynamically, purely mechanically, or else in combination. In the latter case the lockup clutch 4 is operated with slippage, while at the same time a partial transmission of power still takes place through the hydrodynamic component 2. The transmission of power through the hydrodynamic component 2 is realized in this case from input E of power transmission unit 1 to pump wheel P, here through the housing 7 or the coupling of input shaft E of power transmission unit 1 with pump wheel P through housing 7. From the hydrodynamic rotational speed/torque converter 6 the power is transmitted through the at least indirect coupling with transmission input shaft 5 to the latter. Here transmission input shaft 5 forms the output A of power transmission unit 1. If bypassing of the hydrodynamic power transmission is desired, i.e., removal of the hydrodynamic power branch, lockup clutch 4 is activated. That is done by pressurizing pressure chamber 25. Piston 21 is moved in the axial direction and the frictional engagement between the first and second friction surface arrangements 9, 10 is created. The transmission of power takes place through the rotationally fixed coupling of piston element 21, which is simultaneously designed as friction surface carrying element 15, from input E, housing 7, to first friction surface arrangement 9, second friction surface arrangement 10, through device 11 for damping vibrations, to transmission input shaft 5. Even with lockup clutch 4 engaged, the cooling circuit can be maintained via cooling channels in the lockup clutch.

The solution according to the invention is thus characterized in that the actuating element 14 in the form of piston element 21 functions simultaneously as friction surface carrying element 15 and thus as a component of the first friction surface arrangement 9, and furthermore that it is connected in a rotationally fixed manner to input E of power transmission unit 1, but movable in the axial direction. Furthermore, actuating mechanism 14 and hence pressure chamber 25 is sealed from pressure chambers 24, 23. The sealing exists both against the connection between input E and pump wheel P and also against transmission input shaft 5.

Thus actuating mechanism 14 is characterized by a concentration of functions. In particular when lockup clutch 4 is designed as a disk clutch, an additional friction surface carrying element 15 can be dispensed with. That allows the axial construction space to be minimized. The support in the axial direction is provided by a stop 30. The latter preferably takes the form of a stationary friction surface carrying element 15 of the first friction arrangement 9.

Corresponding to FIG. 1a, turbine wheel T is connected to input 12 of device 11 for damping vibrations. The coupling with the input 12 can be done in different ways, depending on the design, i.e., in immediate proximity to transmission input shaft 5 or outside. The latter design offers the advantage that even when power is transmitted through the hydrodynamic component the device 11 for damping vibrations is always effective here.

While FIG. 1a explains an embodiment with turbine wheel T linked to the connection between device 1 for damping vibrations and transmission input shaft 5, FIG. 1b explains a design of power transmission unit 1 according to FIG. 1a with direct coupling of turbine wheel T to transmission input shaft 5. In this case damper 11 is effective only in purely mechanical operation, that is, when power is transmitted via lockup clutch 4. The remainder of the construction of power transmission device 1 corresponds to that described in FIG. 1a; for that reason the same reference labels are used for the same elements. Lockup clutch 4, actuating mechanism 14 and housing 7 of rotational speed/torque converter unit 6 are situated coaxially to each other in both versions. The transmission of power to the second friction surface arrangement 10 takes place through the axial movability of first friction surface arrangement 9, in particular of piston element 21, which forms a friction surface carrying element 15, with respect to second friction surface arrangement 10, the latter being held quasi in its axial position due to stop 30 in the direction of actuation of actuating mechanism 14. The wall of housing 7 is of shell-shaped design here. In the simplest case it is a pump wheel shell 31, which is coupled with pump wheel P in a rotationally fixed manner. First friction surface 9 is connected to the inner housing wall through a ring-shaped element 34, which has a frictional, positive or materially bonded connection to the inner wall 32 of housing 7, preferably materially bonded, and in the radial direction forms a sealing surface 33 for the actuating mechanism 14, in particular the piston element 21. Ring-shaped element 34 is characterized here at least by two areas of differing diameter in the radial direction, which are offset from each other in the axial direction. The first area 35 is characterized by a smaller diameter $d_{i35}$. The sealing surface 33 is formed here at an area 36 which points in a radial direction toward the axis of rotation R of the hydrodynamic rotational speed/torque converter 6. A second area is also provided, designated as 37. The second area 37 serves to provide the rotationally fixed coupling between lockup clutch 4 or the first friction surface arrangement 9 and actuating mechanism 14 with the ring-shaped element 34 and thus with housing 7 in the connection between input E and pump wheel P. The second area 37 is characterized here by a larger inside diameter $d_{i37}$ than the first area 35, and functions quasi as a carrier for the friction surface carrying elements of the first friction arrangement 9, in particular as an outer lamella carrier. The rotationally fixed coupling between the ring-shaped element 34 and the housing 7 is preferably material-bonded in the depicted case. That ensures a sealed separation of pressure chambers, in particular 25 and 23 or 24, and the ring-shaped element 34 is an integral component or forms a structural unit with the housing wall of the housing 7. The rotationally fixed connection of piston element 21 with ring-shaped element 34 and thus with housing 7 takes place here through gearing, which simultaneously permits axial movability. To that end the second area 37 has gearing on its inner circumference 38, which can be brought into operative connection with complementary gearing on the outer circumference 41 of the friction surface carrying elements 15 of first friction surface element 9 and thus in the radial direction on actuating mechanism 14. Actuating mechanism 14 is thus engaged with the gearing 39. Other designs of rotationally fixed connections are also conceivable. What is crucial is that a rotationally fixed connection is produced by positive or friction fit, which simultaneously permits axial movability. Surface 36 on the first area 35 functions as a sealing surface 33, as stated earlier. To that end, actuating element 14 is preferably designed in such a way that it is either designed with appropriate fit in the installed position in regard to this surface area and can be guided so that it slides with the latter on the inner wall of the housing, in particular the ring-shaped element 34, or else at a distance, which is better in terms of wear phenomena. In this case, however, a contact and movable seal is provided. The latter is the first sealing device 26 between actuating mechanism 14 or piston element 21 and housing 7, here the first area 35, in particular a surface area 36 of ring-shaped element 34 turned toward axis of rotation R, which is an integral component of housing 7 through the material-bonded connection. Actuating mechanism 14, in particular piston element 21, is thus likewise characterized in the radial direction by different areas. The individual areas are shaped by the form of piston element 21. In the simplest case the latter is designed as a shaped sheet metal part, and is characterized essentially by four areas. The first area 42 forms a surface area 43 oriented in the radial direction, which is parallel to the surface 36 in the first area 35, with the first sealing device 26 positioned. This first area is therefore also designated as the sealing area. The second area 45 is the stop area; it carries the stop 46, which is formed parallel to the inner wall of the housing 7 or the ring-shaped element 34, in particular the wall of the ring-shaped element 34 between the first and second areas 35 and 37, and thus limits the motion contrary to the direction of actuation. The third area is the friction surface bearing area 47, in which the friction surface is situated and the coupling with the housing 7 also takes place. The fourth area 64 provides guidance and sealing with respect to transmission input shaft 5.

Because of the rotationally fixed coupling between piston element 21 and ring-shaped element 34, and hence housing 7, piston 21 is free of a rotational fixed connection with transmission input shaft 5. However, the piston is situated in such a way with respect to the latter that it is possible to arrange a sealing device 27 between piston 21 and transmission input shaft 5. The arrangement takes place between surface areas facing each other on the piston 21 and the outer circumference 48 of the transmission input shaft. The corresponding surface area is formed here by a hub-type extension in the radial direction on piston 21. This is identified as 49 and is ring-shaped; it encloses transmission input shaft 5 in the circumferential direction, and the sealing device 27 is situated in the axial direction in this area of enclosure, which is free of a rotationally fixed coupling. Sealing device 27 is incorporated into a groove 50, which is situated on the surface of the hub-type extension 49 turned toward transmission input shaft 5. This sealing device 27 is likewise a contact seal but a movable seal, which is also moved in the axial direction relative to the outer circumference 48 of transmission input shaft 5 when there is axial movement of piston element 21 relative to the second friction surface arrangement 10. The inner housing wall, in particular housing 7, ring-shaped element 34 and of piston element 21 with sealing devices 26 and 27 limit pressure chamber 25 in the radial and axial directions, which pressure chamber is coupled with channel 20 to charge the actuating mechanism 14 with a pressure medium. This channel 20 is routed here for example through transmission input shaft 5. Other designs are also conceivable, for example through an element coupled with input E of power transmission device 1 in a rotationally fixed manner.

In addition, piston element 21 in its position opposite the outer circumference of the hydrodynamic rotational speed/torque converter 6, which is not depicted in its entirety here, describes the additional pressure chamber 24, which provides for the return or inflow of process fluids from the converter or to the converter. To that end channel 18 is provided in the axial direction between the device 11 for damping vibrations and the actuating mechanism 14. However, this channel is separated from pressure chamber 25, which corresponds to the activation chamber, by a liquid-proof and pressure-medium-proof separation. This is done for example by providing a tube-shaped element 51 in the transmission input shaft 5.

Besides the design as a sheet metal part, piston element 21 can alternatively also be produced from other materials, for example cast iron, alloys, light metal, a synthetic or a fiber composite material.

Appropriate means 52 are provided for supporting, guiding and pre-tensioning piston element 21. These may be assigned to piston element 21 on one side or both sides. These include at least one spring device 53, including at least one spring unit 54 with at least one spring element 56, depending on the design. According to FIGS. 1a and 1b, one spring unit 54 is provided. The latter supports piston element 21 in the radially inner area 58 opposite the output A, in particular on the hub 55 for connecting between output 13 of device 11 for damping vibrations. Spring unit 54 is situated in the axial direction between the face 57 of piston element 21 directed away from the inner housing wall 32, which face 57 is directed toward the converter, and a surface area 59 on the hub 55 pointing toward the latter.

Spring unit 54 is designed here in such a way that it includes at least one through opening, preferably a plurality of through openings 60, which permit a flow of process fluid through the spring element 56. The individual through openings 60 can be situated adjacent to each other in the circumferential direction at the same distance or at varying intervals. In the simplest case, a spring element 56 in the form of a diaphragm spring is used. The position of the spring element 56 is fixed here in the axial direction, radial direction and circumferential direction on at least one of the two support areas. This can be done in various ways. Conceivable possibilities are fastening devices or a simple positive fit. In the case depicted, the connection to the piston element 21 uses means 63.

FIGS. 1a and 1b explain a design having only one-sided support of piston element 21. FIGS. 2 through 5 explain additional designs of the spring devices 53 with support of piston element 21 on both sides in the axial direction, in a schematic depiction on the basis of a detail from a power transmission unit 1 according to FIG. 1a. The basic construction corresponds to that described in FIG. 1a; for that reason the same reference labels are used for the same elements.

Figure 2:
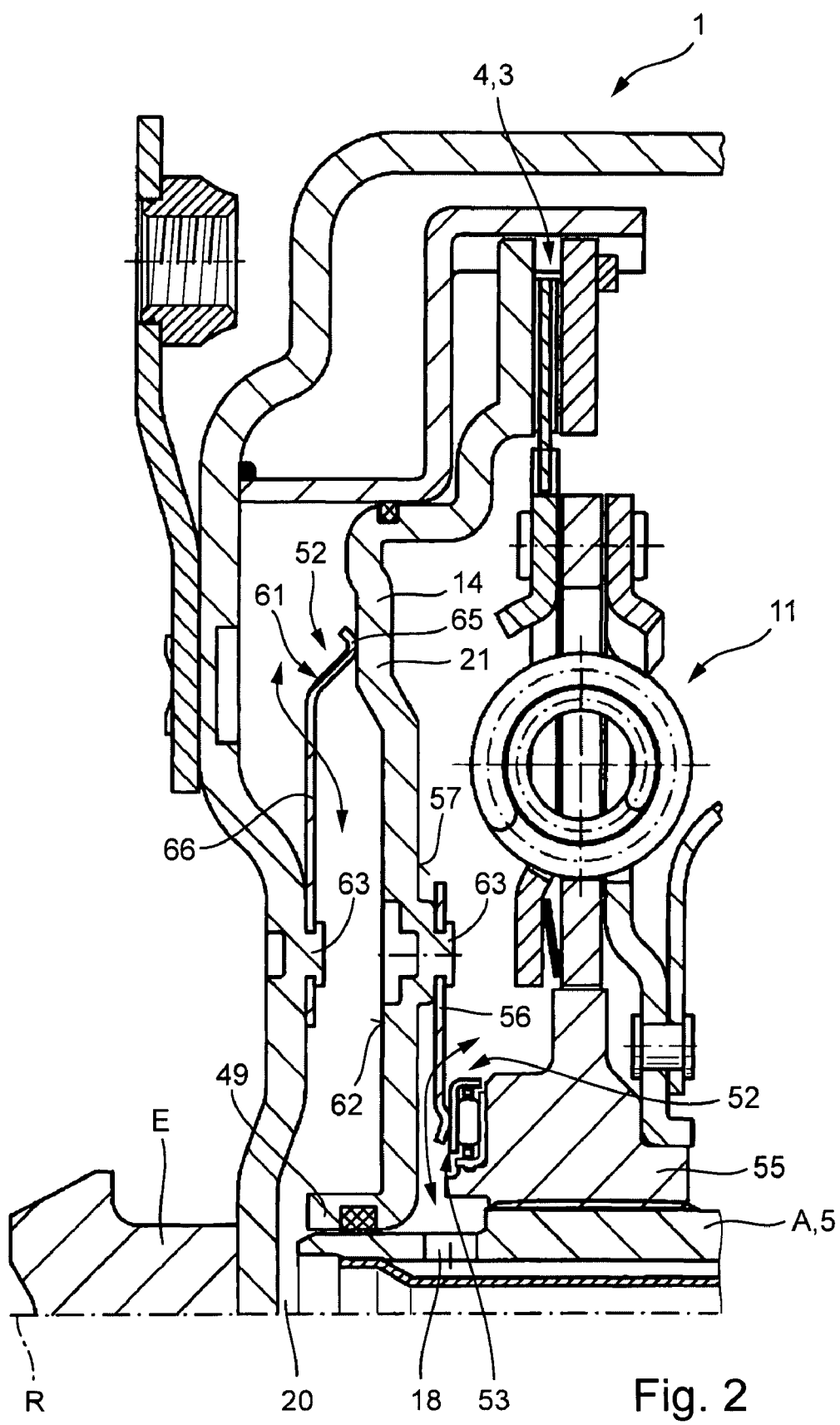
FIG. 2 explains a first embodiment on the basis of a detail from an axial sectional view of a power transmission unit.

According to FIG. 2 another spring unit 61 is provided, which is effective on the other face 62 of piston element 21, which points to the inner wall of housing 7 in the axial direction. To that end, the position of spring element 61 is fixed in the axial direction with respect to housing 7, and acts with its other end area 65 on the face 62 of piston element 21 in the direction of actuation. Here too, to realize uniform pressurization over the entire piston surface in the radial direction the spring element 61 is constructed with through openings 66, which allow a transfer of process fluid or control medium. The directions of flow are indicated with double arrows. The spring element 61 can be a ring-shaped spring element, or individual elements forming a spring unit, distributed in the circumferential direction preferably at a uniform distance from each other. The position of the spring element 61 is fixed on housing 7 using means 63.

The means 63 essentially provide fixing in the axial direction. In addition, they can enable fixing of the spring elements 61, 56 in the circumferential and radial directions.

Figure 3:
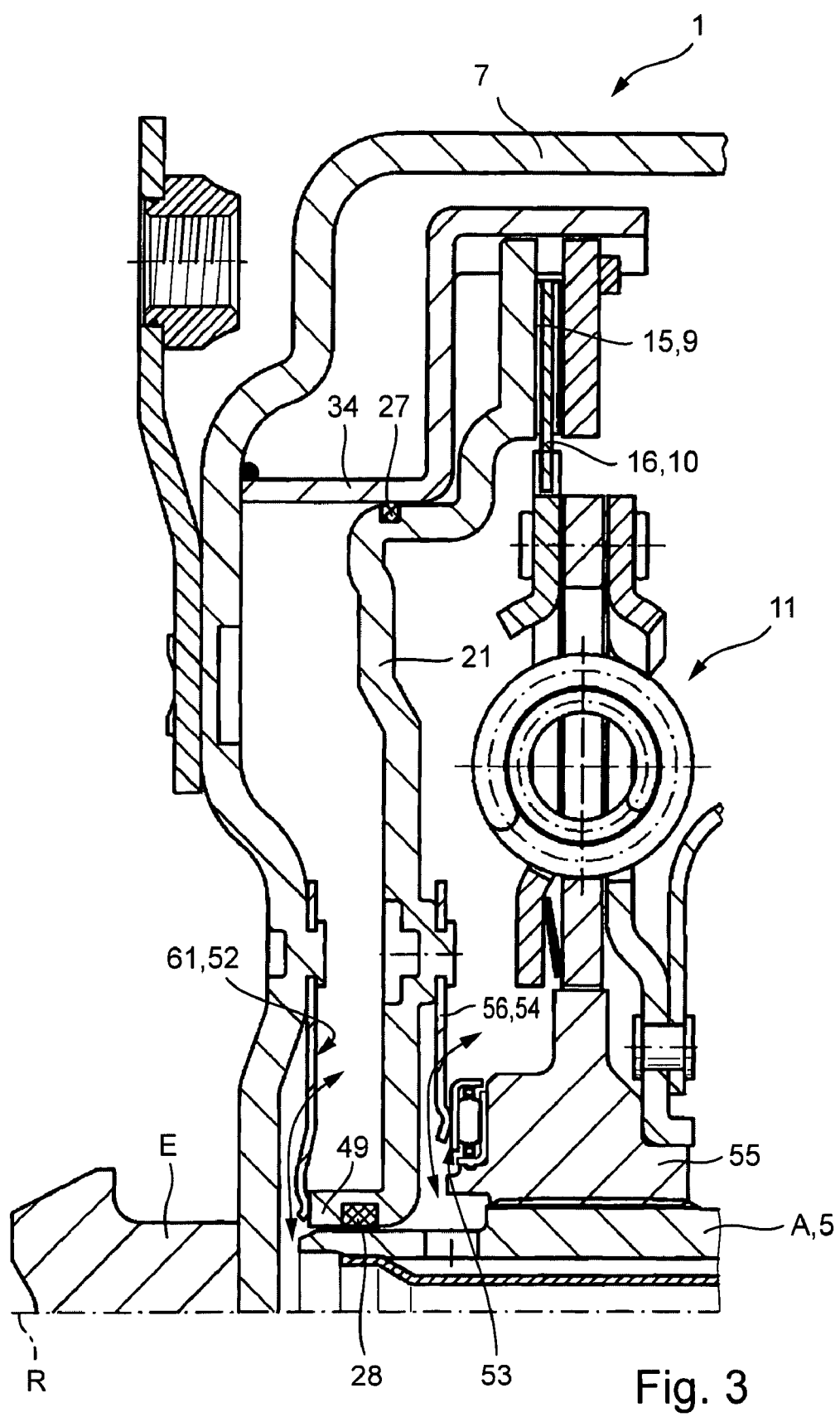
FIG. 3 explains a refinement of the design of the spring device on the basis of an embodiment according to FIG. 2; and, FIGS. 4a and 4b explain a refinement of the embodiment according to FIG. 2 with the spring device fixed.

If spring element 61 is braced here against the piston surface facing in the radial direction, FIG. 3 explains an alternative design for the second spring element 61. The latter is supported on the downward side in the hub area 49 of piston element 21.

Figure 4A:
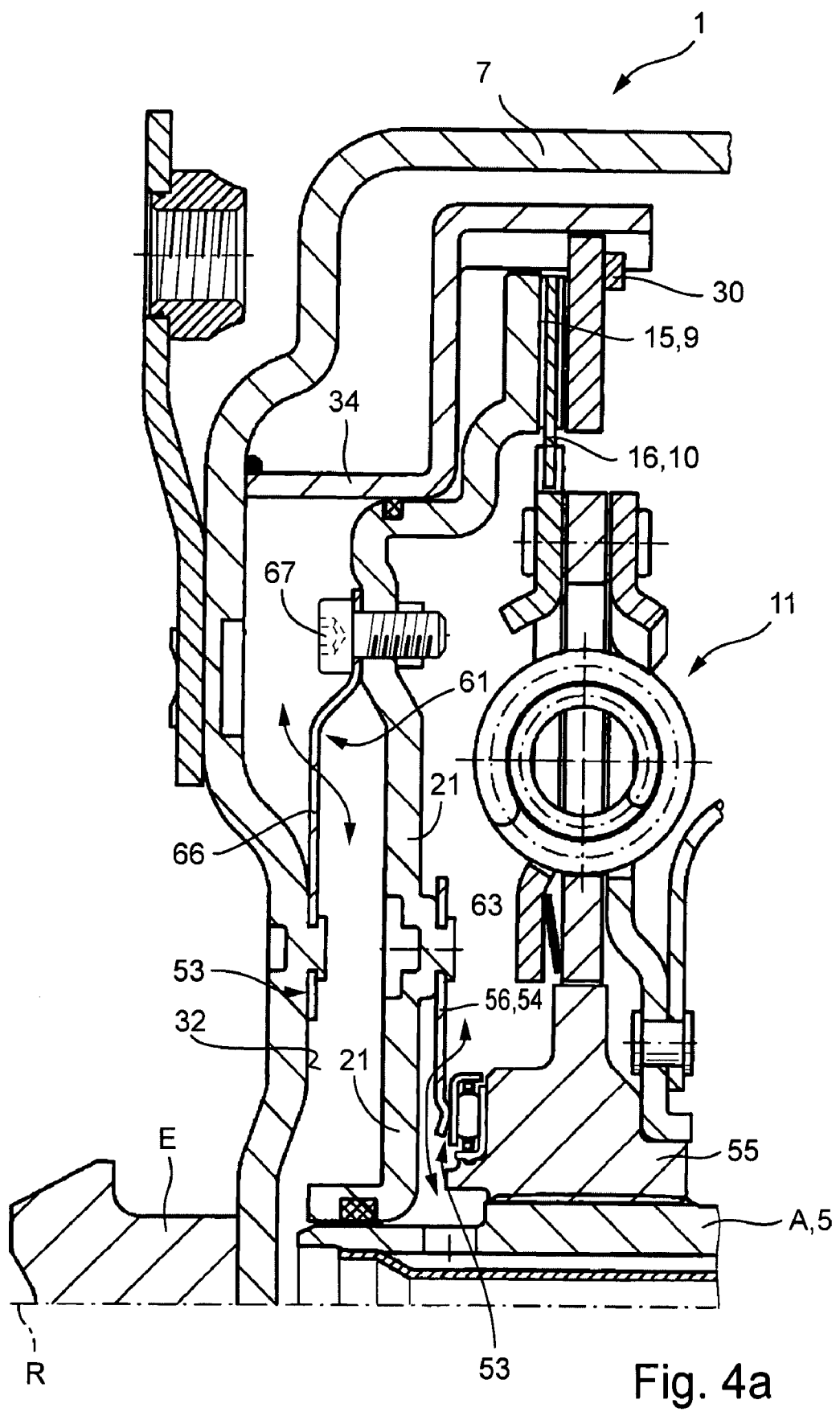
Figure 4B:
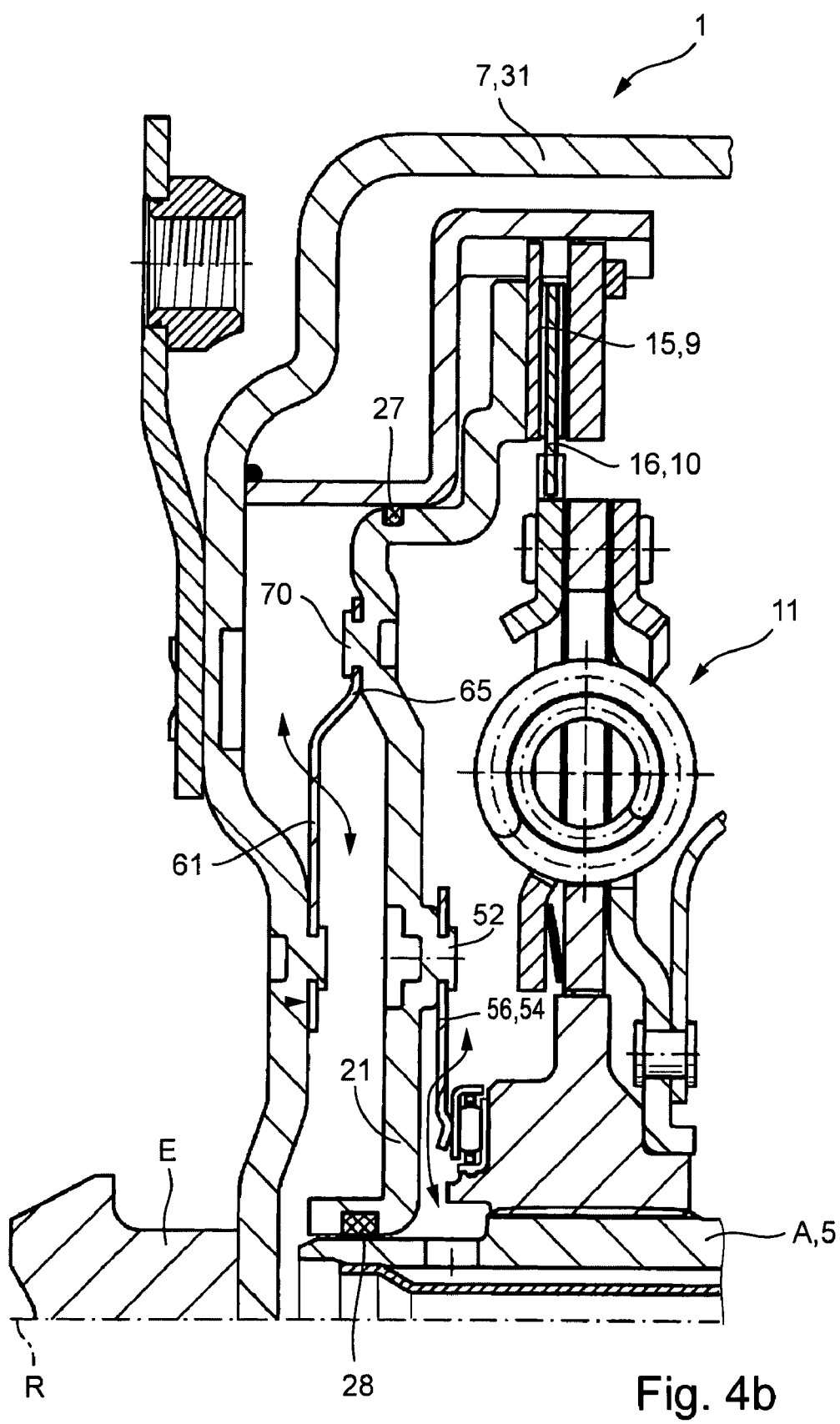

FIGS. 4a and 4b explain alternatives to the design according to FIG. 2 for the connection of spring unit 61. The basic construction corresponds to that described in the figures, including in particular with regard to the arrangement of the first spring unit 54 and the second spring unit 61. The only thing different here is that the support is not free of a rotationally fixed connection and a fixed connection in the axial direction, but rather the spring element or the spring unit 61 is fixed here both on piston element 21 and housing 7 in the axial direction. According to FIG. 4a, the attachment to piston element 21 is made via a Huck bolt 67.

In contrast, FIG. 4b explains an alternative design, in which instead of the fixing in the circumferential direction, axial direction and radial direction in FIG. 4a the fixing is accomplished chiefly in the axial direction by a positive fit, in particular a clamp or plug-in connection 70 on both piston element 21 and housing 7.

REFERENCE LABELS 1 power transmission device
2 hydrodynamic component
3 device for bypassing the hydrodynamic flow of power
4 lockup clutch
5 transmission input shaft
6 hydrodynamic rotational speed/torque converter
7 housing
8 intermediate space
9 first friction surface arrangement
10 second friction surface arrangement
11 device for damping vibrations
12 input
13 output
14 actuating mechanism
15 friction surface carrying element
16 friction surface carrying element
17 first channel
18 second channel
19 intermediate space
20 third channel
21 piston
22 friction surface
23 first pressure chamber
24 second pressure chamber
25 third pressure chamber
26 sealing apparatus
27 first sealing device
28 second sealing device
29 means of spring and/or damping coupling
30 stop
31 shell
32 inner wall
33 sealing surface
34 ring-shaped element
35 first area
36 surface
37 second area
38 inner circumference
39 gearing
40 gearing
41 outer circumference
42 first area
43 surface
47 friction surface bearing area
48 outer circumference
49 hub-like extension
50 groove
51 tube-shaped element
52 means of pre-tensioning
53 spring device
54 spring unit
55 hub
56 spring element
57 face
58 radially inner area
59 surface
60 through opening
61 spring unit
62 face
63 means
64 fourth area
65 end area
66 through opening
67 Huck bolt
68 primary mass
69 secondary mass
70 clamp connection
E input
A output
P pump wheel
T turbine wheel
L guide wheel
$d_i$ inside diameter
$d_a$ outside diameter

What is claimed is:

1. A power transmission device (1), in particular for use in motor vehicles, with one input (E) and at least one output (A), comprising:

a hydrodynamic component (2), comprising at least one pump wheel (P) and one turbine wheel (T), which together form at least one working chamber (23) that is fillable with process fluid;

a lockup clutch (4) which is assigned to the hydrodynamic component (2) for at least partial bypassing of the flow of power through the hydrodynamic component (2), comprising a first friction surface arrangement (9) that includes at least one friction surface carrying element (15) and is at least indirectly coupled with the input (E) and a second friction surface arrangement (10) that includes at least one friction surface carrying element (16) and is coupled with the output (A), which can be brought in operative connection with each other using an actuating mechanism (14) comprising a piston element (21) that is pressurizable with a pressure medium, wherein:

the actuating mechanism (14) forms one structural unit with a friction surface carrying element (15) of the first friction surface arrangement (9), and is connected in a rotationally fixed manner, but so that it is movable in the axial direction to the input (E) of the power transmission device (1) or to the connection between the input (E) of the power transmission device (1) and the pump wheel (P) and is free of a rotationally fixed connection to the output (A), having a sealing apparatus (26) comprising at least one first sealing device (27) and one second sealing device (28) to seal a pressure chamber (25) that is able to charge the actuating mechanism (14) with pressure medium against the hydrodynamic component (2), the first sealing device (27) being situated between the actuating mechanism (14) and the connection between the input (E) of the power transmission device (1) and the pump wheel (P) and the second sealing device (28) being directly situated between the actuating mechanism (14) and the output (A) of the power transmission device (1) for creating a sealed connection between the actuating mechanism (14) and the output (A).

2. The power transmission device (1) recited in claim 1 wherein the means (52) for position fixing and/or pre-tensioning the actuating mechanism (14) in the axial direction include a spring device (53) that works on at least one side of the actuating mechanism (14).

3. The power transmission device (1) recited in claim 2 wherein the means (52) for position fixing and/or pre-tensioning the actuating mechanism (14) in the axial direction include a spring device (53) that works on both sides of the actuating mechanism (14) and the spring device (53) has a second spring unit (61) that is situated between a face (62) of the actuating mechanism pointing away from the hydrodynamic component (2) and the housing (7).

4. The power transmission device (1) recited in claim 3 wherein the first spring unit (54) is braced in the radial direction in the area where the piston element (21) is guided at the output (A).

5. The power transmission device (1) recited in claim 2 wherein the first and second spring units (54, 61) of the spring device (53) are fixed in their position in the radial direction and axial direction on at least one of the two elements that are tensioned against each other actuating mechanism (14) and/or housing (7) and/or output (A) or elements coupled with these in a rotationally fixed manner.

6. The power transmission device (1) recited in claim 5 wherein the position fixing is friction-locked or positive-locked.

7. The power transmission device (1) recited in claim 2 wherein the spring device (53) includes a first spring unit (54) that is situated between a face (57) pointing to the hydrodynamic component (2) and the output (A) or an element coupled to the latter in a rotationally fixed manner on a surface pointing in the axial direction.

8. The power transmission device (1) recited in claim 2 wherein the spring device (53) has through openings (60, 66) for the fluid flows in the power transmission device (1).

9. The power transmission device (1) recited in claim 2 wherein the first and second spring units (54, 61) include a diaphragm spring or are made up of a plurality of individual spring elements arranged at intervals from each other in the circumferential direction.

10. The power transmission device (1) recited in claim 1, wherein the piston element (21) is preferably designed as a formed part and has at least four areas, a first and second sealing area (42, 64), a stop area (45) to limit the axial movability in the direction contrary to the lockup clutch (4), and a friction surface bearing area (47), where the sealing areas (42, 64) have surface areas that are designed parallel to the connecting elements housing (7) and output (A), and the sealing devices (27, 28) being situated between these.

11. The power transmission device (1) recited in claim 10, wherein the first sealing device (27) is situated between a surface area on the actuating mechanism (14) that is oriented in the radial direction and a surface area on the connection between the input (E) of the power transmission device (1) and the hydrodynamic component (2) pointing in the radial direction to an axis of rotation (R) for the power transmission device (1), and the second sealing device (28) in the radial direction between the output (A) of the power transmission device (1) and the actuating mechanism (14).

12. The power transmission device (1) recited in claim 1 wherein the rotationally fixed connection between the actuating mechanism (14) and the connection between the input (E) of the power transmission device (1) and the pump wheel (P) is of friction-lock or positive-lock design.

13. The power transmission device (1) recited in claim 12 wherein the piston element (21) of the actuating mechanism (14) includes a partial area having gearing (40) in the radial direction in the area of the outer circumference, which can be brought into operative connection with complementary gearing (39) on the connection between input (E) of the power transmission device (1) and pump wheel (P).

14. The power transmission device (1) recited in claim 1 further comprising means (52) for position fixing and/or pretensioning the actuating mechanism (14) in the axial direction.

15. The power transmission device (1) recited in claim 1 wherein the piston unit (21) is executed as a shaped sheet metal part.

16. The power transmission device (1) recited in claim 1 wherein the piston unit (21) is made of a cast iron material, light metal, synthetic or a fiber composite material.

17. The power transmission unit (1) recited in claim 1 wherein the transmission is designed as a three-channel system, including a first connection (17) for coupling with the working chamber of the hydrodynamic component (2), a second connection (18) for coupling the intermediate space (24) between outer circumference of the hydrodynamic component (2) and housing (7), and a third connection (20) for coupling with the pressure chamber (25) assigned to the piston element (21) for charging with a pressure medium.

18. The power transmission device (1) recited in claim 1 wherein the hydrodynamic component (2) is designed as a hydrodynamic rotational speed/torque converter (6), including in addition at least one guide wheel (L).

* * * * *

UNITED STATES PATENT AND TRADEMARK OFFICE
CERTIFICATE OF CORRECTION

| | |
|---|---|
| PATENT NO. | : 7,513,346 B2 |
| APPLICATION NO. | : 11/904220 |
| DATED | : April 7, 2009 |
| INVENTOR(S) | : Mario Degler and Bruno Mueller |

It is certified that error appears in the above-identified patent and that said Letters Patent is hereby corrected as shown below:

Column 15 - Line 22 through Line 26 should read:

2. The power transmission device (1) recited in Claim 14 wherein the means (52) for position fixing and/or pre-tensioning the actuating mechanism (14) in the axial direction include a spring device (53) that works on at least one side of the actuating mechanism (14).

Signed and Sealed this

Sixth Day of October, 2009

David J. Kappos
*Director of the United States Patent and Trademark Office*